(12) United States Patent
Haase et al.

(10) Patent No.: US 8,092,506 B2
(45) Date of Patent: Jan. 10, 2012

(54) IONIC FOOT BATH ARRAY WITH IONIC CIRCULATION

(76) Inventors: Steven Haase, Lincoln, NE (US);
Sherry Haase, Lincoln, NE (US); Greg Holle, Beatrice, NE (US); Tamera Holle, Beatrice, NE (US)

( * ) Notice: Subject to any disclaimer, the term of this patent is extended or adjusted under 35 U.S.C. 154(b) by 1159 days.

(21) Appl. No.: 11/899,874

(22) Filed: Sep. 7, 2007

(65) Prior Publication Data

US 2009/0065353 A1    Mar. 12, 2009

(51) Int. Cl.
*A61H 33/00* (2006.01)
(52) U.S. Cl. ............................................. 607/86; 601/16
(58) Field of Classification Search ................ 607/3, 75, 607/81–86; 128/898
See application file for complete search history.

(56) References Cited

U.S. PATENT DOCUMENTS

| | | | | |
|---|---|---|---|---|
| 3,184,655 A | * | 5/1965 | Brown | 335/285 |
| 3,380,080 A | * | 4/1968 | Farrell | 4/622 |
| 4,497,313 A | * | 2/1985 | Kurosawa | 601/16 |
| 6,725,471 B2 | * | 4/2004 | Ferber et al. | 4/622 |
| 7,160,434 B2 | * | 1/2007 | Becker et al. | 205/742 |
| RE40,035 E | * | 1/2008 | Crome | 205/634 |
| 2005/0187496 A1 | * | 8/2005 | Ho | 601/15 |
| 2008/0087288 A1 | * | 4/2008 | Wun | 128/898 |

* cited by examiner

*Primary Examiner* — Sam Yao
*Assistant Examiner* — Jeffrey Lipitz
(74) *Attorney, Agent, or Firm* — Stinson Morrison Hecker LLP

(57) ABSTRACT

An ionic foot bath array for generating an ionic foot bath includes an upper rod support structure, at least one electrically non-conductive support structure leg depending downwards from the upper rod support structure and a plurality of generally cylindrical electrically conductive ionic rods each having the same diameter, the ionic rods being removably mounted and depending downwards from the upper rod support structure, each of the ionic rods extending generally parallel with one another in spaced-apart relationship in at least two generally parallel rows, the ionic rods having an intra-row spacing therebetween of no greater than two times the diameter of each ionic rod, the rows being spaced no greater than three times the diameter of each ionic rod, with at least one of the rows being positively charged and at least one of the rows being negatively charged.

14 Claims, 4 Drawing Sheets

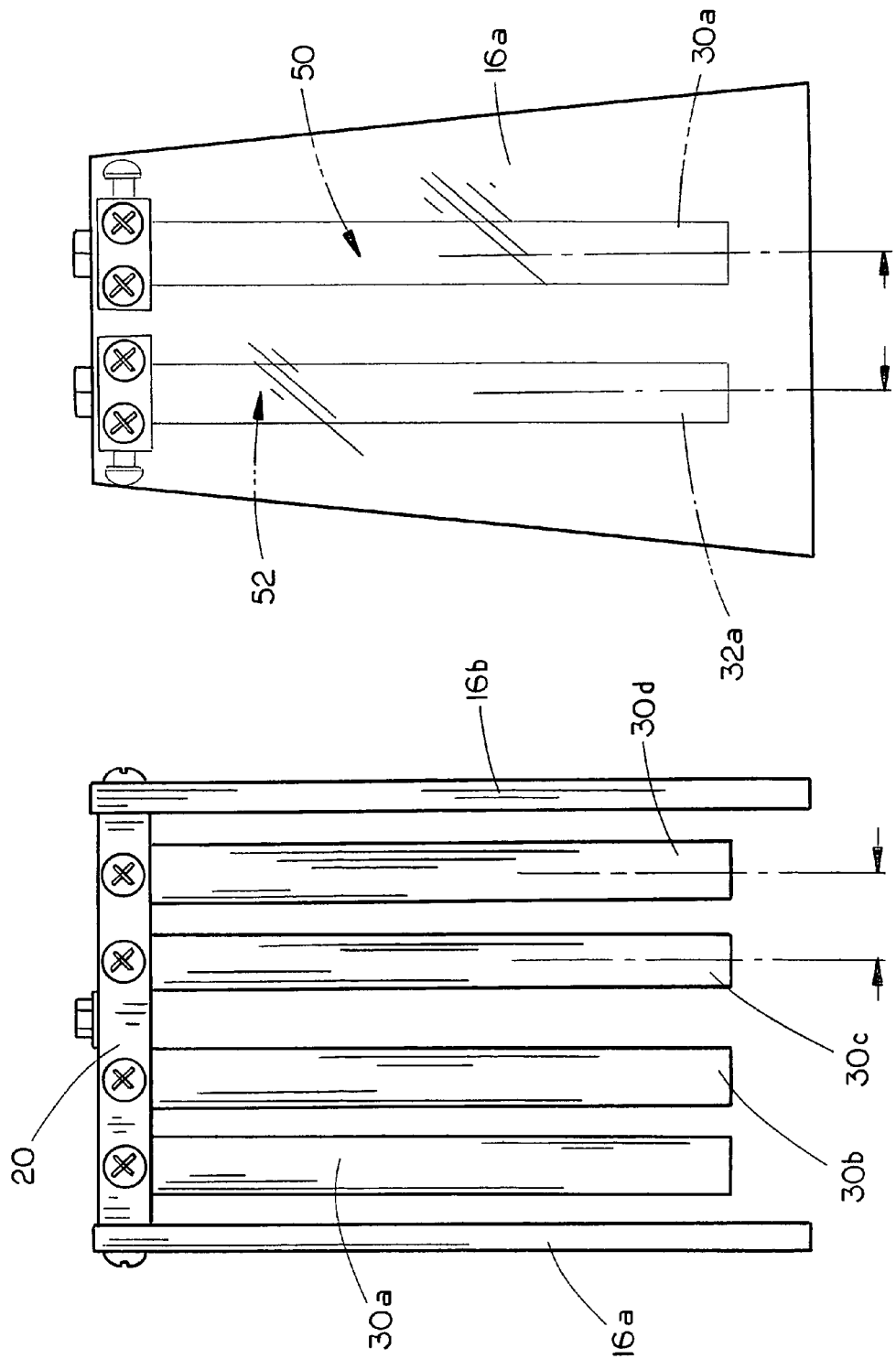

IONIC FOOT BATH ARRAY WITH IONIC CIRCULATION

BACKGROUND OF THE INVENTION

1. Technical Field

The present invention relates generally to ionic foot baths and, more particularly, to an ionic foot bath array for generating an ionic foot bath which includes an upper rod support structure, at least one electrically non-conductive support structure leg depending downwards from the upper rod support structure and adapted to extend into and rest on the base wall of a basin in the water solution in which the ionic foot bath array is being placed and a plurality of generally cylindrical stainless steel ionic rods each having the same diameter, the ionic rods being removably mounted and depending downwards from the upper rod support structure, each of the ionic rods extending generally parallel with one another in spaced-apart relationship in at least two generally parallel rows, the ionic rods having an intra-row spacing therebetween of no greater than two times the diameter of each ionic rod, the rows being spaced no greater than three times the diameter of each ionic rod, with at least one of the rows being positively charged and at least one of the rows being negatively charged.

2. Description of the Prior Art

Foot bath devices provide a relatively simple and expedient way in which a person can relieve tension and stress, thus increasing relaxation and providing a brief yet meaningful respite from the stress and strain of everyday life. Moreover, foot bath devices can be used to treat some ailments, and the rejuvenating properties of foot baths are likewise well-known. There are many different kinds of foot baths which are currently used, including vibrating liquid massage baths and small whirlpool-type baths, but one of the most useful type of foot baths currently used is the ionic foot bath. Whether the person using the ionic foot bath goes to a foot spa or has a home ionic foot bath, many health benefits may be obtained from the use thereof.

The manner in which ionic foot baths function is generally the same, as will be described below. Ionic foot baths operate through a process called electrolysis. In this process, an electrical current is generated within the foot bath water which causes the molecules of water to divide producing negative ions. Once an abundance of these negative ions are present in the foot bath water, the body then absorbs the ions through osmosis, which is the movement of particles through a membrane from a higher concentration to a lower concentration. In this case the higher concentration refers to the negative ions produced by the ion field that is set up by placing electrodes into the water. As the vast majority of foreign contaminate matter found on the feet and within the body is positively charged, including such matter as harmful chemicals, heavy metals, parasites and other such materials, the negative ions are attracted to the positively charged foreign contaminates and bind with those foreign contaminates. The body then can readily eliminate the bound foreign contaminates through its own natural processes. The ionic foot bath thus provides more than mere refreshment and revitalization of the feet of the individual, but furthermore binds and removes foreign contaminates therefrom to clean and invigorate the feet.

However, although many ionic foot baths found in the prior art do provide revitalization of the feet and other body parts, this is achieved solely through the production of the ions, and if the ion production is concentrated around the ion producing elements of the device without providing circulation of the ions within the bath, the full benefits of the ionic bath are not realized as the main concentration of ions does not reach the feet. Moreover, due to the high salt content of the foot bath when in use, any propeller or other such circulation generation device would likely quickly degrade in operation due to its immersion in the water, thus mandating frequent replacement of the circulation generation device. There is therefore a need for an improved ionic foot bath array with ionic circulation which causes circulation in the water within the bath thereby increasing the beneficial features of the ionic foot bath without requiring use of mechanical circulation devices.

Therefore, an object of the present invention is to provide an improved ionic foot bath array with ionic circulation.

Another object of the present invention is to provide an improved ionic foot bath array which includes its own support stand which rests within the basin in the water of the foot bath to render it easier to use the device in that the user need not fit the array to the particular basin in which he or she will be undertaking the foot bath.

Another object of the present invention is to provide an improved ionic foot bath array in which the generally cylindrical ionic rods are positioned generally parallel with one another depending from the upper support structure and are positioned in spaced-apart relationship of at least two generally parallel rows thereby forming an array of ionic rods between which current flows and produces ions in the water.

Another object of the present invention is to provide an improved ionic foot bath array in which the depending ionic rods are generally cylindrical and are mounted in at least two generally parallel rows, the ionic rods having an intra-row spacing therebetween of no greater than two times the diameter of each ionic rod, the rows being transversely spaced no greater than three times the diameter of each ionic rod, which generates an ionic circulation current in the foot bath to circulate the ions within the foot bath.

Finally, an object of the present invention is to provide an improved ionic foot bath array which is relatively simple and durable in design and manufacture and is safe, efficient and effective in use.

SUMMARY OF THE INVENTION

The present invention discloses an improved ionic foot bath array for generating an ionic foot bath including an upper rod support structure and at least one electrically non-conductive support structure leg depending downwards from the upper rod support structure for supporting the upper rod support in an elevated position, the at least one support structure leg adapted to extend into and rest on the base wall of a basin in the water solution therein in which the ionic foot bath array is placed. A plurality of generally cylindrical electrically conductive ionic rods are removably mounted on and depend downwards from the upper rod support structure, and each of the plurality of generally cylindrical ionic rods have the same diameter, the ionic rods being removably mounted and depending downwards from the upper rod support structure. Each of the plurality of ionic rods extend generally parallel with one another in spaced-apart relationship in at least two generally parallel rows. Further, the plurality of ionic rods have an intra-row spacing therebetween of no greater than two times the diameter of each ionic rod and the two generally parallel rows are spaced transversely between adjacent ones thereof no greater than three times the diameter of each of the plurality of ionic rods, with at least one of the at least two rows being positively charged and at least one of the at least two rows being negatively charged.

The present invention thus provides a substantial improvement over those ionic foot bath devices found in the prior art.

For example, because the ionic bars are spaced closely together yet extend generally parallel with each other, an ionic circulation current is generated within the foot bath to circulate the ions within the foot bath, thus increasing the health benefits of the ionic foot bath generated by the present invention. Also, because the ionic rods are supported on the rod support structure which is supported within the basin in which the foot bath is taking place, there is far less likelihood that the foot bath array will not be positioned correctly within the basin as is encountered with several prior art devices which rest on the edges of the tub or basin in which they are being used. Finally, because the present invention includes closely spaced ionic rods, the volume of ions generated by the present invention is increased, and because these are circulated through the foot bath via the ionic circulation current, the ion osmosis rate is increased thus decreasing the amount of time necessary to conduct the foot bath while simultaneously increasing the efficiency of the foot bath. It is therefore seen that the present invention provides a substantial improvement over those ionic foot baths found in the prior art.

BRIEF DESCRIPTION OF THE DRAWINGS

FIG. 3 is a side elevational view of the ionic foot bath array showing the intra-row spacing of the rods;

FIG. 4 is an end elevational view of the present invention showing the inter-row spacing of the rods.

DESCRIPTION OF THE PREFERRED EMBODIMENT

Figure 1:
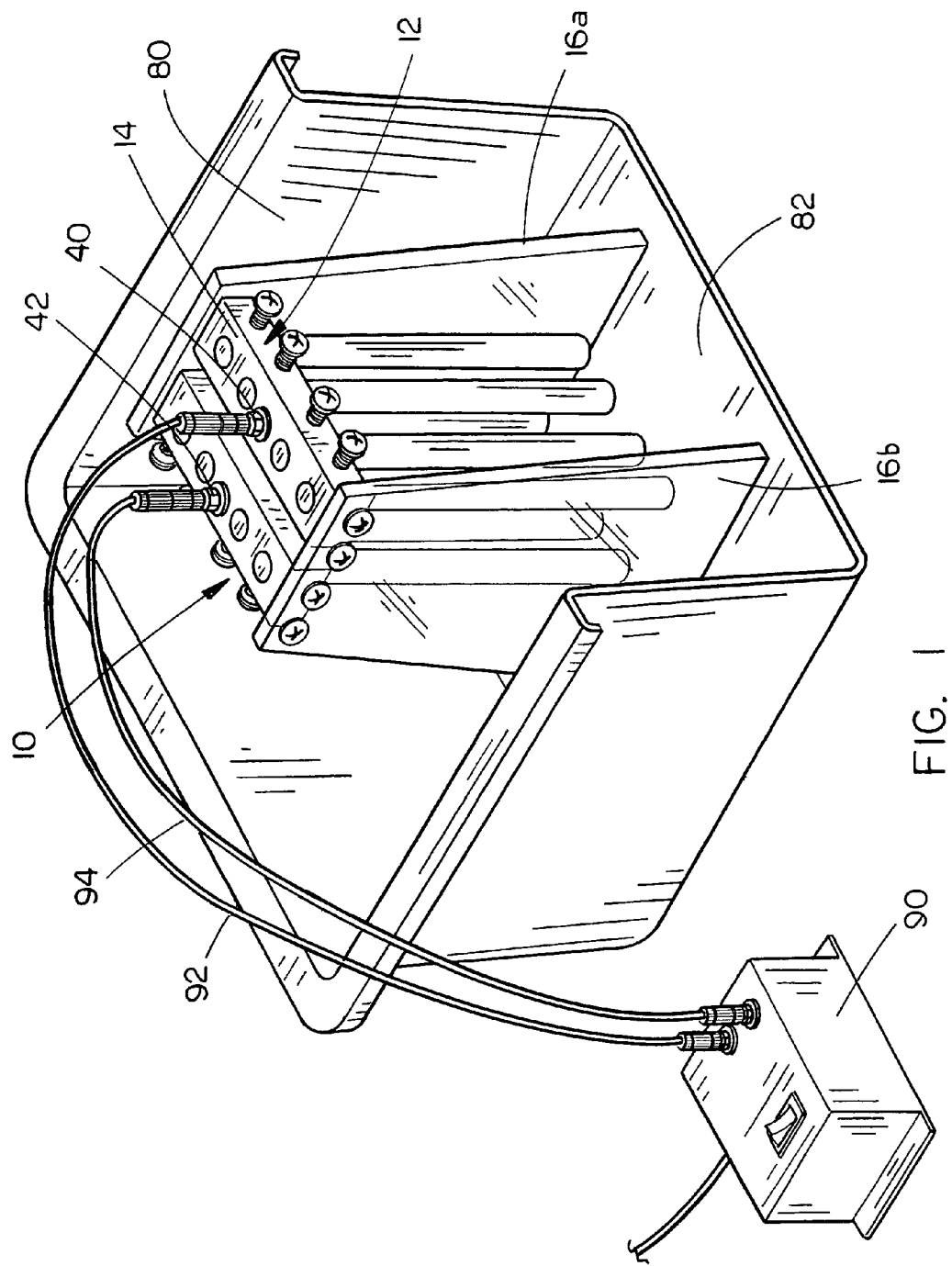
FIG. 1 is a detailed perspective view of the improved ionic foot bath array of the present invention prepared for use in a basin.

The improved ionic foot bath array 10 of the present invention is shown best in FIGS. 1-4 as including an ionic rod support structure 12 which includes an upper rod support structure 14 and two downwardly depending support structure legs 16a and 16b which are secured to the upper rod support structure 14 by a plurality of screws 18 or other such connection devices. In the preferred embodiment, the upper rod support structure 14 would be constructed of a conductive metal such as aluminum, although steel, brass, or copper could also be used, and would preferably be coated or constructed in such a manner as to preclude rusting or tarnishing due to contact with water, should such a coating be necessary. The upper rod support structure 14 would preferably have dimensions of approximately three to six inches in length, two to four inches in width, and have a thickness of approximately one-half inch, and would further include a positive support bar 20 and a negative support bar 22 which extend generally parallel with one another and are spaced apart a sufficient distance to preclude arcing of the electrical current therebetween which would short-circuit the invention.

Figure 5:
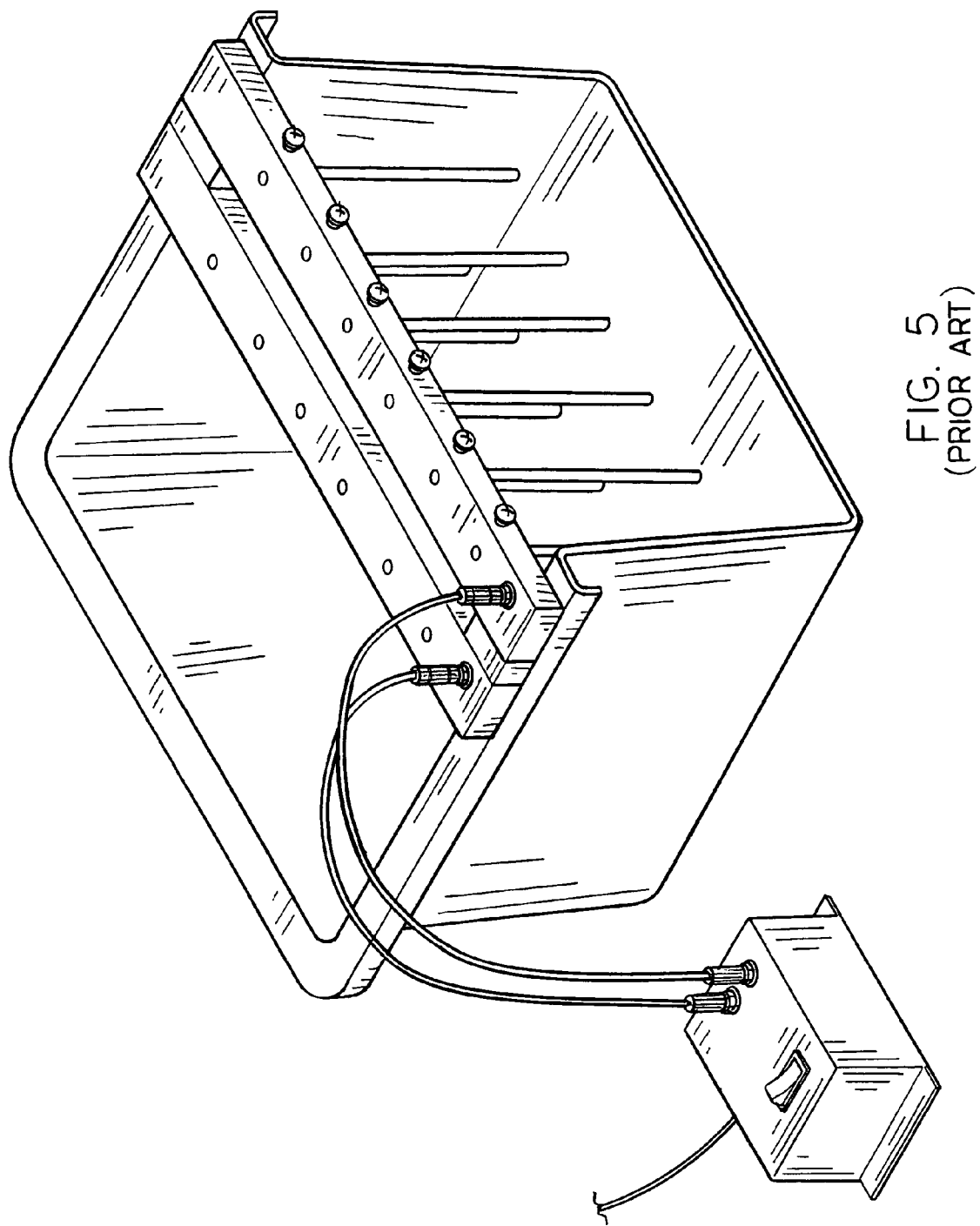
FIG. 5 is a perspective view of an ionic foot bath of the prior art.

In the preferred embodiment, the support structure legs 16a and 16b would be constructed of a transparent or translucent molded plastic material which is electrically non-conductive and is heat, impact and decay resistant. The support structure legs 16a and 16b would preferably be either molded or cut from a plastic material such as LEXAN® or the like, although the precise nature of the construction material used in connection with the support structure legs 16a and 16b is not particularly critical to the present invention so long as it is electrically non-conductive and provides a stable and secure support for the upper rod support structure 14, hence the generally trapezoidal shape of the support structure legs 16a and 16b, as shown best in FIGS. 1 and 2. The support structure legs 16a and 16b thus would rest on the base wall 82 of basin 80 in which the foot bath is to take place, and it is an important feature of the present invention that the support structure legs 16a and 16b rest within the basin 80 instead of being connected to or replaced by the basin 80 itself, as shown in the prior art of FIG. 5. This design makes it far easier to use the ionic foot bath array 10 of the present invention, as basins of many different sizes and shapes may be used, and it is a relatively simple matter to insert the ionic foot bath array 10 of the present invention in the basin 80 for use therein. This improvement is not shown in the prior art.

As the positive and negative support bars 20 and 22 are generally identical to one another in the preferred embodiment, the following description of positive support bar 20 should be understood to apply generally to negative support bar 22. In the preferred embodiment, positive support bar 20 would include a plurality of vertical rod support holes 24a, 24b, 24c and 24d which extend through the positive support bar 20. These rod support holes 24a-d have diameters slightly in excess of the diameters of the ionic rods 30a, 30b, 30c and 30d which extend therethrough and are supported within the rod support holes 24a-d by a plurality of set screws 26a, 26b, 26c and 26d which extend partially into the rod support holes 24a-d. The set screws 26a-d may be tightened to frictionally engage the ionic rods 30a-d resting within the rod support holes 24a-d such that the ionic rods 30a-d now are depending from and are supported within the rod support holes 24a-d. Of course, numerous other types of securement devices may be substituted for the rod support holes 24a-d and set screws 26a-d as described in the present invention, but it is found that the simplicity of the present securement system is a benefit to the present invention and the rod support holes 24a-d and set screws 26a-d function perfectly fine to secure the ionic rods 30a-d on the upper rod support structure 14.

Figure 2:
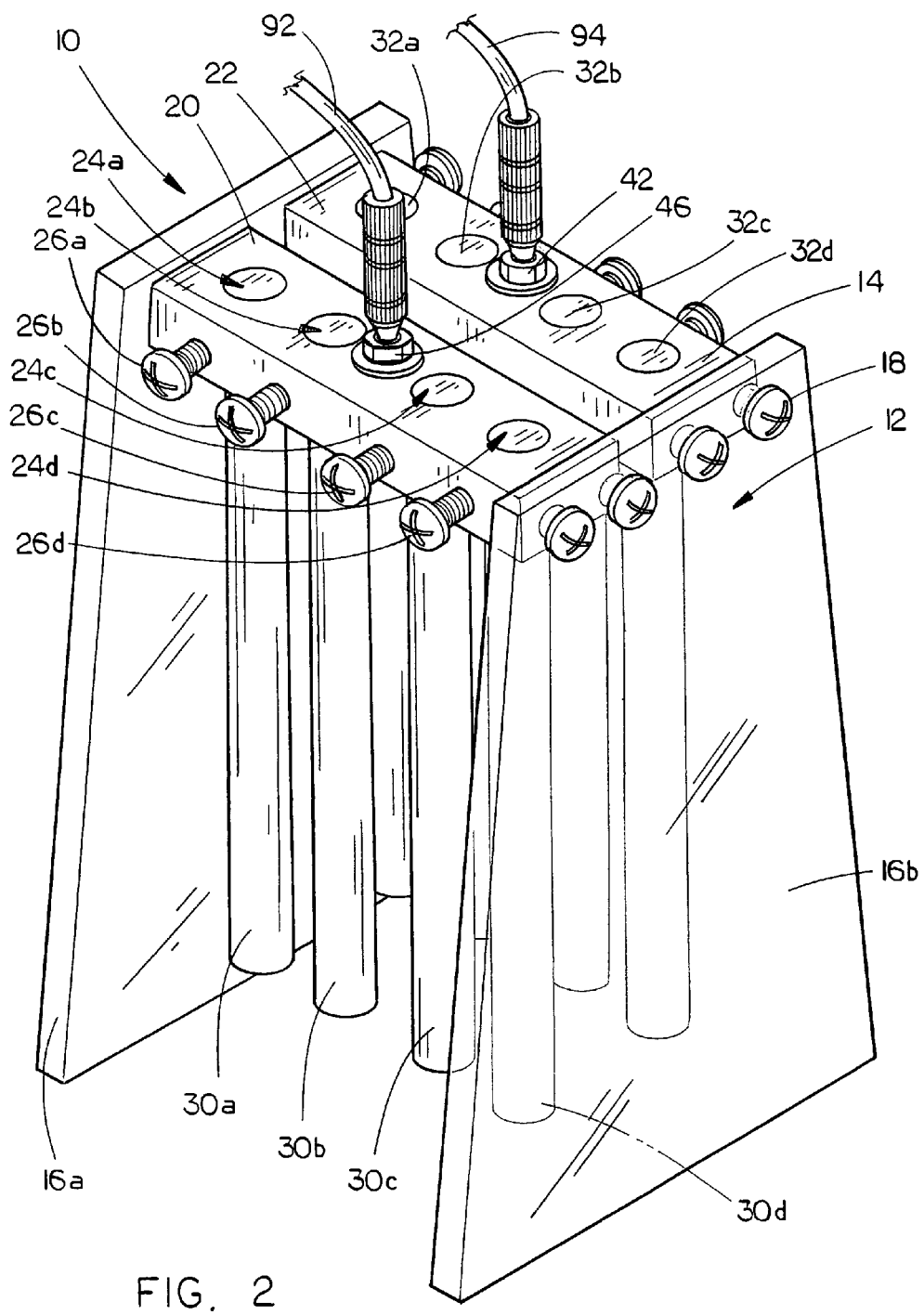
FIG. 2 is a detailed perspective view of the ionic foot bath array of the present invention.

The ionic rods 30a-d and 32a-d which are suspended from the positive and negative support bars 20 and 22, as shown best in FIGS. 1 and 2, extend generally parallel with one another and are generally cylindrical in shape. A critical feature of the ionic rods 30a-d and 32a-d, however, is that the intra-row spacing between each of the ionic rods 30a-d and 32a-d is no greater than two diameters of an ionic rod 30a-d and 32a-d, as shown best in FIG. 3, and which, in the preferred embodiment, would be approximately three-eighths to one-half inch (⅜" to ½") which has been found to provide sufficient ion production for the ionic foot bath of the present invention. Furthermore, the spacing between each of the rows 50 and 52 would be no greater than three diameters of an ionic rod 30a-d and 32a-d, as shown best in FIG. 4, as it has been found that the combination of the intra-row and inter-row spacing described above generates an ionic circulation current within the ionic foot bath which moves the ions produced within the bath throughout the bath into contact with the body part positioned within the bath. This significantly increases the amount of ion interaction with the body part, thus increasing the rate of ion osmosis into the body taking place within the bath and therefore increasing the health benefits of the ionic foot bath without degrading the safety and efficiency of the present invention. Finally, it should be noted that the number of ionic rods 30a-d and 32a-d may vary with the size of the array, but it is expected that the majority of arrays will include a total of either six or eight (6 or 8) ionic rods 30a-d and 32a-d.

In operation, the improved ionic foot bath array 10 of the present invention would function in the following manner. The ionic foot bath array 10 would be placed within the basin 80 with the support structure legs 16a and 16b resting on base wall 82 of base wall 80. A direct current power supply 90 would then be connected to the ionic foot bath array 10 via electrical wires 92 and 94, with electrical wire 94 being the negative wire connected to the negative support bar 22 at wire terminal 42 and positive electrical wire 92 being connected to positive support bar 20 at positive terminal 40. The basin 80 would then be partially filed with water (not shown) and salts or other such minerals would be added to the water to allow the water to conduct electricity, as per common practice for ionic foot baths. The DC power supply 90 would then be turned on, thus feeding power to the ionic foot bath array 10 such that electrical current flows through the upper rod support structure 14 with the positive lead connected to the positive support bar 20 and the negative lead connected to the negative support bar 22, and from there into the ionic rods 30a-d and 32a-d of the ionic foot bath array 10. The positive current flowing in ionic rods 30a-d and negative connection of ionic rods 32a-d causes the electrical current to flow between the ionic rods 30a-d and 32a-d through the water to complete the circuit, thus producing negatively charged ions within the water due to the electrical charge passing through the array. This causes the molecules of the metals within the array, in combination with the water and other elements in the water, to divide thus generating positive and negative ions. These negative ions which are produced are then absorbed into the body through the feet via osmosis and this assists in the detoxification of the feet and, by extension, the body of the person using the ionic foot bath array 10 of the present invention. Furthermore, due to the spacing of the ionic rods 30a-d and 32a-d, an ionic circulation current is generated within the foot bath which, as was discussed previously, increases the rate of ion osmosis thus increasing the health benefits provided by the present invention. Finally, once the detoxification process is completed, the DC power supply 90 is turned off and the ionic foot bath array 10 of the present invention is ready for another use.

It is to be understood that numerous additions, modification and substitutions may be made to the ionic foot bath array 10 of the present invention which fall within the intended broad scope of the appended claims. For example, the size, shape, construction materials and number of ionic rods and rows thereof used in connection with the ionic foot bath array 10 of the present invention may be modified or changed so long as the relative positioning of the ionic rods 30a-d and 32a-d remains as was described above, namely that the intra-row spacing between each of the ionic rods 30a-d and 32a-d is no greater than two diameters of an ionic rod 30a-d and 32a-d and the inter-row spacing between each of the rows 50 and 52 would be no greater than three diameters of an ionic rod 30a-d and 32a-d. Furthermore, although the present invention has been described for use in connection with foot baths, it is entirely possible that the ionic foot bath array 10 of the present invention may be used in connection with bathing of other body parts, and such modifications would be understood by those skilled in the art of ionic bath treatments. Finally, although the present invention has been described as including positive and negative support bars 20 and 22, it is entirely possible that multiple support bars may be used in connection with the present invention to increase the ion production capacity of the present invention.

There has therefore been shown and described an ionic foot bath array 10 which generates an ionic circulation current and which accomplishes at least all of its intended objectives.

We claim:

1. An improved ionic foot bath array for generating an ionic foot bath having an ionic circulation current formed therein, said array comprising:
    an upper rod support structure;
    at least one electrically non-conductive support structure leg depending downwards from said upper rod support structure for supporting said upper rod support in an elevated position, said at least one support structure leg adapted to extend into and rest on the base wall of a basin in the water solution therein in which said ionic foot bath array is placed;
    a plurality of generally cylindrical electrically conductive ionic rods removably mounted on and depending downwards from said upper rod support structure;
    each of said plurality of generally cylindrical ionic rods having the same diameter, the ionic rods being removably mounted and depending downwards from the upper rod support structure;
    each of said plurality of ionic rods extending generally parallel with one another in spaced-apart relationship in at least two generally parallel rows;
    said plurality of ionic rods having an intra-row spacing therebetween of no greater than two times the diameter of each ionic rod;
    said at least two generally parallel rows being spaced transversely between adjacent ones thereof no greater than three times the diameter of each of said plurality of ionic rods, at least one of said at least two rows being positively charged and at least one of said at least two rows being negatively charged.

2. The improved ionic foot bath array of claim 1 wherein said upper rod support structure comprises a positive and a negative support bar each including a plurality of vertical rod support holes which extend vertically through said positive and negative support bars, each of said plurality of rod support holes having diameters slightly greater than the diameters of each of said plurality of ionic rods such that said plurality of ionic rods extend through said rod support holes, one rod per hole, and depend downwards from said positive and negative support bars.

3. The improved ionic foot bath array of claim 2 further comprising a plurality of set screws which extend partially into said rod support holes, said set screws operative to alternatively frictionally engage and release said plurality of ionic rods resting within said rod support holes such that said ionic rods depend from and are supported within said rod support holes.

4. The improved ionic foot bath array of claim 1 wherein each of said plurality of generally cylindrical ionic rods has a diameter of between three-eighths inches and one-half inch (3/8" and 1/2").

5. The improved ionic foot bath array of claim 1 wherein each of said plurality of generally cylindrical ionic rods is constructed of stainless steel.

6. The improved ionic foot bath array of claim 1 wherein said at least one electrically non-conductive support structure leg is constructed of a plastic material.

7. The improved ionic foot bath array of claim 1 wherein said upper rod support structure is constructed of aluminum.

8. In combination:
    a direct current power supply, positive and negative electrical wires connected to and extending outwards from the power supply and a water basin having a base wall and side walls for containing an amount of water therein; and an improved ionic foot bath array for generating an ionic foot bath having an ionic circulation current formed therein, said array including:

an upper rod support structure;

at least one electrically non-conductive support structure leg depending downwards from said upper rod support structure for supporting said upper rod support in an elevated position, said at least one support structure leg adapted to extend into and rest on said base wall of said basin in the water therein in which said ionic foot bath array is placed;

a plurality of generally cylindrical electrically conductive ionic rods removably mounted on and depending downwards from said upper rod support structure;

each of said plurality of generally cylindrical ionic rods having the same diameter, the ionic rods being removably mounted and depending downwards from the upper rod support structure;

each of said plurality of ionic rods extending generally parallel with one another in spaced-apart relationship in at least two generally parallel rows;

said plurality of ionic rods having an intra-row spacing therebetween of no greater than two times the diameter of each ionic rod;

said at least two generally parallel rows being spaced transversely between adjacent ones thereof no greater than three times the diameter of each of said plurality of ionic rods, at least one of said at least two rows being positively charged and at least one of said at least two rows being negatively charged.

9. The combination of claim 8 wherein said upper rod support structure comprises a positive and a negative support bar each including a plurality of vertical rod support holes which extend vertically through said positive and negative support bars, each of said plurality of rod support holes having diameters slightly greater than the diameters of each of said plurality of ionic rods such that said plurality of ionic rods extend through said rod support holes, one rod per hole, and depend downwards from said positive and negative support bars.

10. The combination of, claim 9 further comprising a plurality of set screws which extend partially into said rod support holes, said set screws operative to alternatively frictionally engage and release said plurality of ionic rods resting within said rod support holes such that said ionic rods depend from and are supported within said rod support holes.

11. The combination of claim 8 wherein each of said plurality of generally cylindrical ionic rods has a diameter of between three-eighths inches and one-half inch (⅜" and ½").

12. The combination of claim 8 wherein each of said plurality of generally cylindrical ionic rods is constructed of stainless steel.

13. The combination of claim 8 wherein said at least one electrically non-conductive support structure leg is constructed of a plastic material.

14. The combination of claim 8 wherein said upper rod support structure is constructed of aluminum.

* * * * *